Aug. 10, 1971     H. E. R. PAPST     3,598,631

PROCESS FOR MANUFACTURING LOW FRICTION SURFACE

Filed March 19, 1969

INVENTOR

HERMANN E. R. PAPST

BY Cushman, Darby & Cushman

ATTORNEYS

3,598,631
PROCESS FOR MANUFACTURING
LOW FRICTION SURFACE
Hermann E. R. Papst, Karl-Maier-Strasse 1,
St. Georgen, Black Forest, Germany
Continuation-in-part of application Ser. No. 629,167,
Apr. 7, 1967, now Patent No. 3,456,903, dated July 22,
1969. This application Mar. 19, 1969, Ser. No. 808,636
Claims priority, application Germany, Apr. 9, 1966,
P 39,186; Sept. 23, 1966, P 41,101
Int. Cl. B44d *1/09*
U.S. Cl. 117—49                                          6 Claims

ABSTRACT OF THE DISCLOSURE

A low-friction flow surface for airship envelopes or outer surfaces of airplanes, flow surfaces of wind-tunnels and the like and the process for manufacturing such low-friction flow surfaces wherein a metal foil is heated and, at the same time, de-gassed immediately after which a hydrophobe layer is applied to the heated foil in a vacuum or a protective gas with said hydrophobe layer being applied by squeezing and subsequently even-melting the material of the hydrophobe layer onto the foil.

BRIEF DESCRIPTION OF THE INVENTION

Figure 1A:
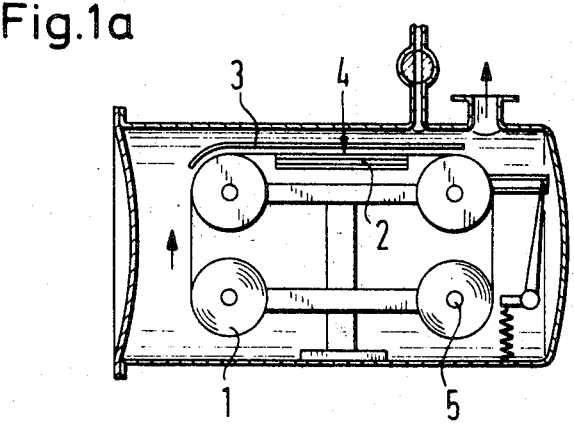

The invention is concerned with a low-friction flow surface, the process for its manufacture and the use of such a surface especially on an envelope (such as the envelope utilized on airships having saturated steam as a buoyant gas according to my copending patent application, Ser. No. 629,167, filed Apr. 7, 1967, and entitled "Airship") now U.S. Pat. No. 3,456,903, issued July 22, 1969, whose carrying fabric is covered with plastic and a metal foil on the outside wall for protection against the action of the sun and the weather or on the inside wall for protection against the action of the buoyant gas. The inventive low-friction flow surface can be used also for outer surfaces of airplanes or even ships and other vehicles or for the flow surfaces of wind tunnels. This application is a continuation-in-part of my copending patent application, Ser. No. 629,167, field Apr. 7, 1967, now U.S. Pat. No. 3,456,903, and entitled "Airship."

Heretofore, metalic surfaces or surfaces consisting of other materials which are exposed to a wind stream or a stream of liquid, have been covered with plastic in order to increase their corrosion resistance. At the same time, any positive influencing of the friction resistance of these surfaces against streams of gas or liquid has been left out of consideration entirely. This friction resistance, even in the case of a streamlined airship with a speed of 125 km./hr. may amount to 57% of the total resistance and it will be correspondingly greater in the case of flow channels, for example wind tunnels, with a higher speed of flow, as a result of which considerable power losses do occur.

Flow surfaces of considerably lower friction resistance were found on the skin of dolphins and salmons with the skin containing a good deal of water (the skin of dolphins can dry up to ⅕ of its living thickness) and a special secretion. The friction of the dolphin skin amounts to only about 40% of the value that is to be expected according to theory.

This effect, known from nature, which is traced back to a gliding of the flow, counter to Prandtl's theory of the border layer, without the formation of the border layer of water on the animal skin, could hitherto not be achieved technically. Along flow surfaces for gases, the development of molecular layers of water vapor leads to corresponding frictional losses.

The invention relates preferably to a coating method for metal surfaces with polytetrafluoroethylene and the above-mentioned uses for such coated surfaces.

It is only known to manufacture such coatings by barking off thin layers from a block of polytetrafluoroethylene and subsequently applying said layers in a veneer-like manner on the metal surfaces.

However, with this known method it is not possible to obtain an electron-optically smooth coating which also is free from any flaws.

Accordingly, such coatings also are not gas-tight, even not up to a thickness of the coating up to about 0.4 mm. Because of this reason said known coatings do not protect for long against corrosive media.

The invention has the purpose of overcoming these disadvantages of the construction that have been known, of creating an improved economical method to produce a practically flaw-free and smooth coating of polytetrafluoroethylene, and the avoiding of such economically harmful losses of power.

The invention is based on the creation of flow surfaces on a metallic base with friction coefficients, which in comparison to what had been known, that are considerably lower, especially coefficients of gas or air friction, and the creation of a process for the manufacture of such flow surfaces, so that the known high frictional losses will be avoided and further progress will be opened up within the framework of flow engineering. According to the invention, the plastic flow surface, which is especially adapted for the envelope of an airship, is characterized by the fact that it consists of a hydrophobe material, especially of fluororesin plastic.

As a hydrophobe material—that is to say a material having a lower surface tension than water—one can use beside fluorinated plastics or hydrophobe fluororesins, organic silicone compounds, polyolefines, polyethylenes or similar material, one can use especially polytetrafluoroethylene, which has been applied practically free of flaws to a degassed metal foil and heated in the high vacuum or under protective gas, said foil being preferably of aluminum, copper, silver, gold or something similar. The hydrophobe covering should be preferably electron-optically smooth especially for use with supersonic aircraft.

On the one side such coatings being strongly hydrophobe, free of flaws and highly smooth can be applied with great success for hygienic purposes, for instance for door grips or other often used apparatuses, especially in a hospital, whereby the risk of infections by contact by means of the deposition of skin fat can be reduced.

On the other side such surface coatings have the advantage of having an extremely low friction for instance in contact with air flows. The great degree of this property of the coatings being produced by the inventive method could not be obtained by other artificial resin coatings before.

According to the invention, the process for the production of this low-friction flow layer is characterized by the fact that a metal foil is guided in a vacuum or under protective gas over a heated roller, thereby being heated and at the same time degassed. Then immediately afterwards, said hydrophobe layer preferably consisting of fluoro-compounds such as polytetra-fluoroethylene is applied to the foil under vacuum or protective gas conditions evenly and without any spots remaining free of coating by pressing a block consisting of the material of the hydrophobe layer against said metal foil and with said layer finally being evenly melted on through further heating, up to a maximum temperature below the decomposition temperature of the hydrophobe material.

It is particularly advantageous for this process if the first heating of the metal foil is accomplished by the heating plates during unwinding of the foil, if the metal foil then is rewound and if the application and melting on of the plastic is carried out under renewed unwinding, whereby the coated metal foil is heated further between the heating plates during the winding back process.

Although, by this the inventive concept is explained only in the embodiment of metal foils the invention can be applied in a quite analogous manner also on metal articles having other shapes of the surfaces to be coated. It is always very important for the invention that the surface to be coated must be substantially free from any water vapor and that this condition is maintained during coating.

Beside achieving a decisive lowering of the friction resistance with the invention, one also coats the flow surfaces with a coating which is water repellent. The metal, therefore, cannot be wetted and this keeps the metal layer lying underneath the coating free of corrosion, that is to say the metal remains smooth and heat or light reflecting. Finally, in the case of very thin metal layers, their foldability is retained and their strength increased which is particularly good for the use of a covering layer glued onto a carrying layer of fabric of a foldable buoyant body of an airship, because this covering layer, as a result of it, is protected at the same time against the influence of light and moisture and has a longer useful life. In the case of airships, the water repellent effect of the flow surface according to the invention avoids an added load on the airship through precipitation of moisture from the atmosphere and it will permit, on the inside surface of a buoyant body lifted by saturated steam, a free dripping down of the steam condensate.

The process according to the invention guarantees an effective manufacture of such a flow surface.

Figure 1B:
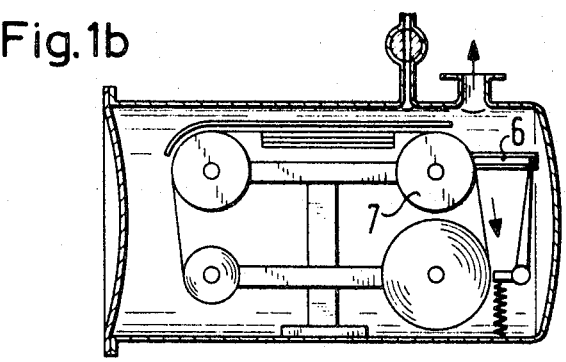
Figure 1C:
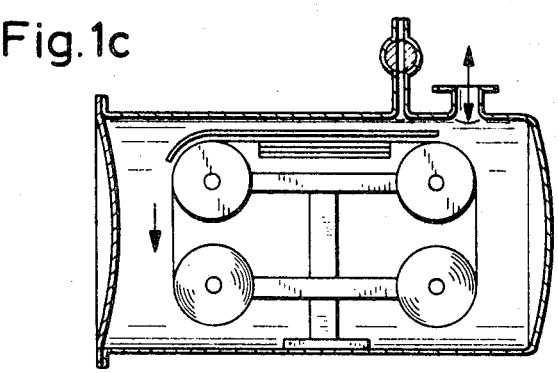

The above-mentioned objects, advantages and features of the present invention will become more apparent from the following detailed description of the invention when taken in conjunction with the accompanying drawings in which:

FIGS. 1a to 1c show schematically in side view a device to carry out the process for the production of a low-friction surface on a metal foil.

The figures show a band of aluminum foil 1, two heating plates 2 and 3, a heating zone 4, a band winch 5, a block 6 made of polytetra fluoroethylene as well as a heated roller 7. The flow surface produced has a surface roughness of the order of magnitude of only $10^{-8}$ cm., that is to say it is electron-optically smooth.

A preferred embodiment of the invention will now be explained in more detail by way of example. For the production of such a hydrophobe flow surface without flaws (e.g. a coating of polytetra fluoro-ethylene on a metal foil such as an aluminum foil) the foil is first freed of its own skin of water vapor through degassing and freeing with simultaneous heating of the aluminum beyond the critical temperature of the water vapor (374° C.). Then, the polytetra fluoro-ethylene is applied in a high vacuum (e.g. through rubbing of the block 6 made of polytetra fluoro-ethylene across the aluminum surface, perhaps in the manner of a brake block) so that the plastic will melt onto the aluminum surface without leaving gaps by becoming a liquid and baking onto the aluminum surface, while at the same time, any residue of water which may still be in the polytetra fluoro-ethylene, will be removed through the high vacuum and through the super heating. In this manner, therefore, one can achieve a polytetra fluoro-ethylene surface which has no flaws caused by water vapor.

The surface of the envelope of an airship covered with this coating is then hydrophobe without gaps and without pores and, therefore, is no longer capable of holding a single molecular skin of water vapor. Thus, the basis of the adhesive layer according to Prandtl's theory of the border layer required by physics, is avoided and a gliding of the adjoining flow lamina is made possible.

According to FIG. 1a, the aluminum foil band 1 is moved from a first winch in a high vacuum inside of an airtight housing through a heating zone 4, formed between the two heating plates (2 and 3) at about 400° C. and it is wound up by the other winch 5. In this step of this process, the block 6 made of polytetra fluoro-ethylene does not rest on the moving metal foil. During this time, the degassing and at the same time the preheating of the metal foil takes place.

In the further step of the process shown in FIG. 1b, the band 1, will again unwind after having been wound back onto the first winch with the block 6 being pressed against the heated roller 7. The polytetra fluoro-ethylene is spread onto the metal foil during this step and it will then melt evenly onto said metal foil while it is rewound between the heating plates 2 and 3.

In the case of the last step of the process according to FIG 1c, a neutral gas free of water vapor is allowed to enter into the housing under an increased pressure, for example argon at 16 atm. The plastic layer applied in the steps shown in FIG. 1b now becomes molten at an increased temperature as it passes between plates 2 and 3, without decomposition, and the plastic layer also becomes more dense and strong under the influence of the above mentioned gas pressure.

In order to achieve a hydrophobe layer without gaps or flaws, one preferably selects as hydrophobe substance for coating of the aluminum foil such a substance which can be heated together with the aluminum foil in the high vacuum beyond the critical temperature of the water vapor and which does not decompose at the same time, but melts densely (tightly) onto the metal foil without any residue of water vapor being enclosed.

The use of polytetrafluoroethylene in this case has the advantage, that it can stand a heating considerably above the critical temperature of the water.

Naturally, it is also possible to use aluminum or other such metal foils with layers applied in a high vacuum, for the achievement of a gliding of the flow border layer (for the purpose of decreasing the surface resistance) in gasses or liquids, on crafts, machines and tools utilized in water, on land and in the air.

While the preferred form of the invention has been shown and described, it is to be understood that all suitable modifications and equivalents may be resorted to which fall within the scope of the invention.

What is claimed is:

1. A process for coating a metal substrate with an antifriction polymeric coating comprising:
    placing said metal substrate within a housing,
    heating said metal substrate to a temperature above the critical temperature of water but below the decomposition temperature of the polymeric coating material to free essentially the surface of said metal substrate of water vapor contained thereon and evacuating said housing to produce an environment therein substantially free of water vapor, and
    while continuing to maintain said environment in said housing substantially free of water vapor, frictionally engaging said heated metal substrate with a solid polymeric material selected from the group consisting of a fluorocarbon resin and a polyolefin, thereby providing an antifriction polymeric coating on said metal substrate.

2. The process of claim 1 wherein said polymeric coating material is polytetrafluoroethylene.

3. A process for coating a metal substrate with an antifriction polymeric coating comprising:
    placing said metal substrate within a housing,
    heating said metal substrate to a temperature above the critical temperature of water but below the decomposition temperature of the polymeric coating material to free essentially the surface of said metal substrate of water vapor contained thereon and introducing into said housing a water-vapor free inert gas under pressure to produce an environment therein substantially free of water vapor and
while continuing to maintain said environment in said housing substantially free of water vapor, frictionally engaging said heated metal substrate with a solid polymeric material selected from the group consisting of a fluorocarbon resin and a polyolefin, thereby providing an antifriction polymeric coating on said metal substrate.

4. The process of claim 3 wherein said polymeric coating material is polytetrafluoroethylene.

5. A process for coating a metal substrate with an antifriction polymeric coating comprising:
placing said metal substrate within a housing,
heating said metal substrate to a temperature above the critical temperature of water but below the decomposition temperature of the polymeric coating material to free essentially the surface of said metal substrate of water vapor contained thereon and evacuating said housing to produce an environment therein substantially free of water vapor,
while continuing to maintain said environment in said housing substantially free of water vapor, frictionally engaging said heated metal substrate with a solid polymeric material selected from the group consisting of a fluorocarbon resin and a polyolefin,
introducing into said housing a water-vapor free inert gas under pressure and heating said polymeric coating material on said substrate.

6. The process of claim 5 wherein said polymeric coating material is polytetrafluoroethylene.

References Cited

UNITED STATES PATENTS

| | | | |
|---|---|---|---|
| 1,545,256 | 7/1925 | Hocker | 117—120X |
| 2,354,763 | 8/1944 | Machlett | 117—120 |
| 2,955,952 | 10/1960 | Herbst | 117—49X |
| 3,130,933 | 4/1964 | Pillsbury et al. | 118—77X |
| 3,319,012 | 5/1967 | Reed et al. | 118—77X |
| 3,456,903 | 7/1969 | Papst | 244—30 |

RALPH S. KENDALL, Primary Examiner

U.S. Cl. X.R.

117—119, 120, 132; 118—77; 244—30

UNITED STATES PATENT OFFICE
CERTIFICATE OF CORRECTION

Patent No. 3,598,631                    Dated August 10, 1971

Inventor(s) Papst, Hermann Ernst Robert

It is certified that error appears in the above-identified patent and that said Letters Patent are hereby corrected as shown below:

At Col. 1, in the heading, change "Sept. 23, 1966" to --December 24, 1966--.

Signed and sealed this 18th day of April 1972.

(SEAL)
Attest:

EDWARD M. FLETCHER, JR.                ROBERT GOTTSCHALK
Attesting Officer                      Commissioner of Patents